April 23, 1940.　　J. B. REPLOGLE　　2,198,506
PUMPING APPARATUS
Filed June 14, 1935　　6 Sheets-Sheet 1
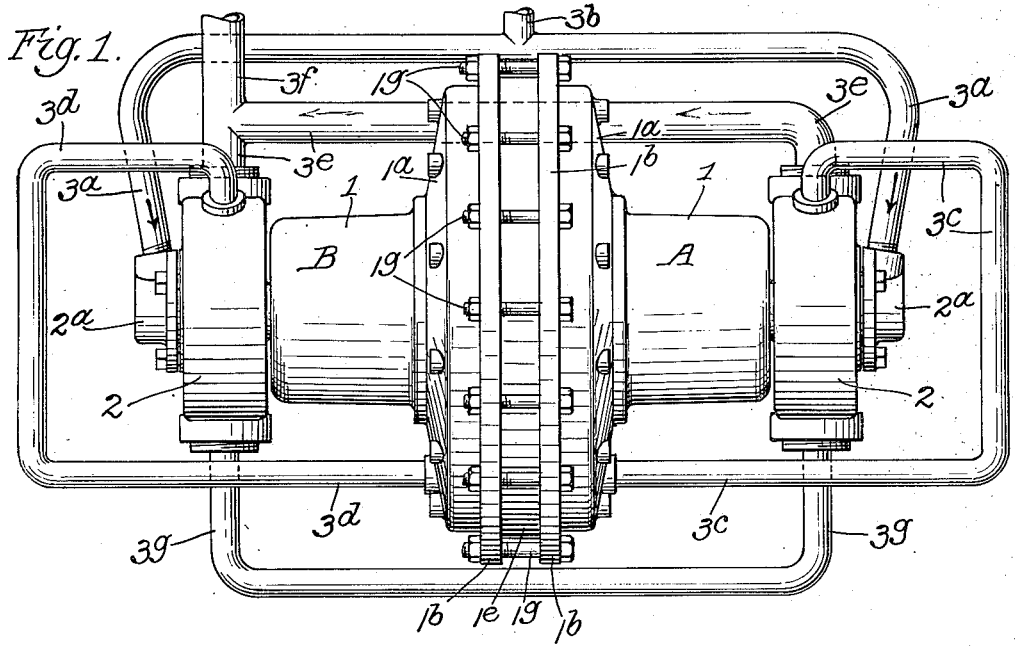
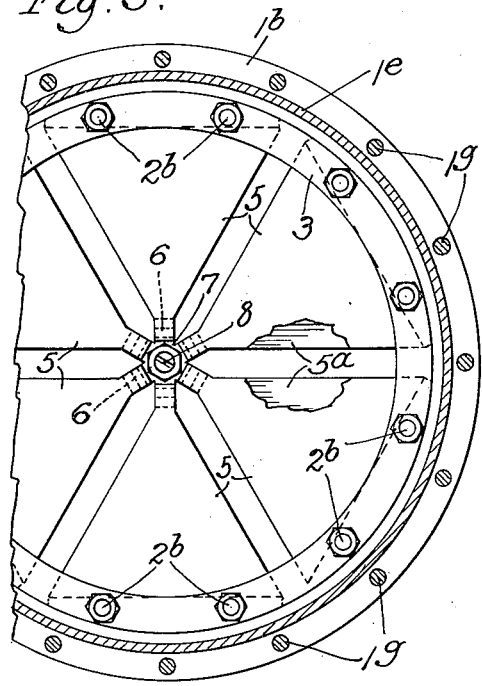
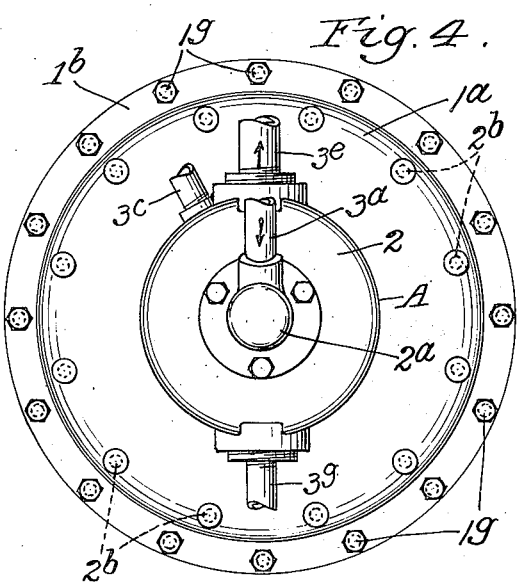
Inventor
James B. Replogle
by Parker & Carter
Attorneys

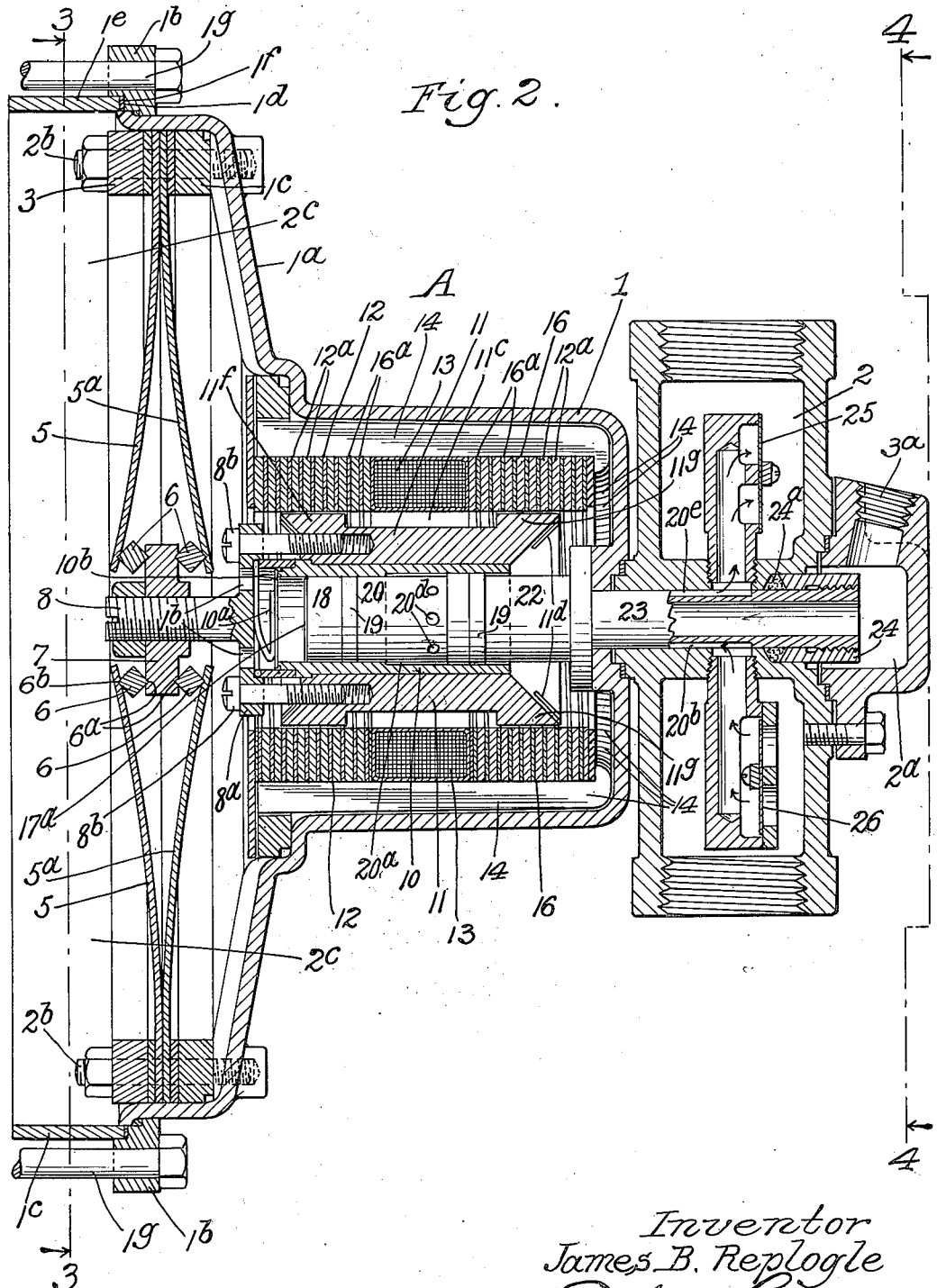

April 23, 1940. J. B. REPLOGLE 2,198,506
PUMPING APPARATUS
Filed June 14, 1935 6 Sheets-Sheet 3
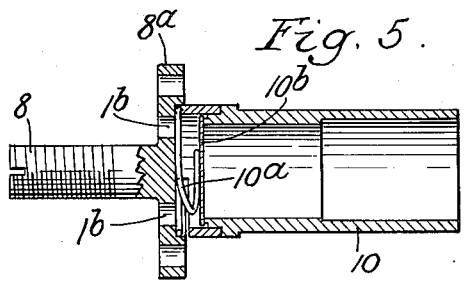
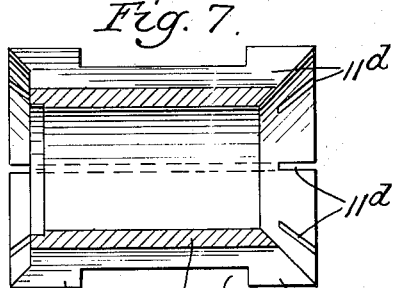
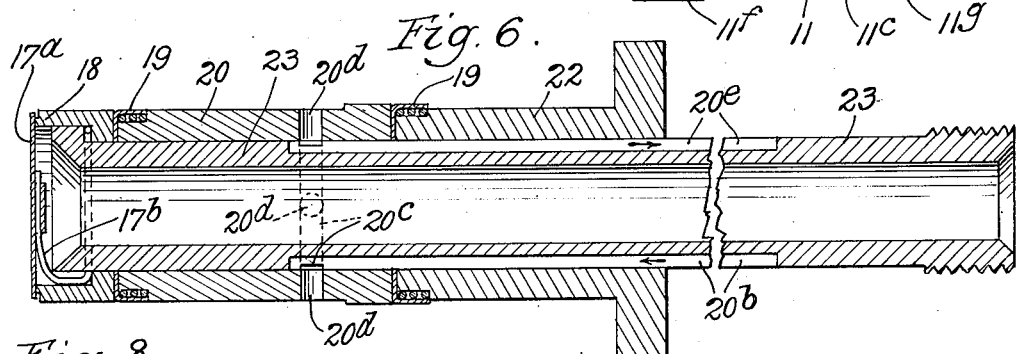
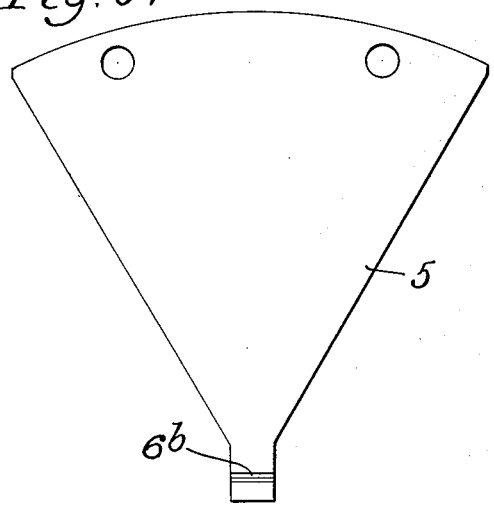
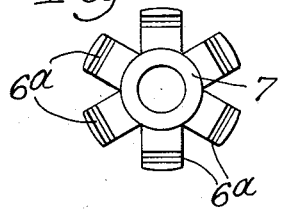
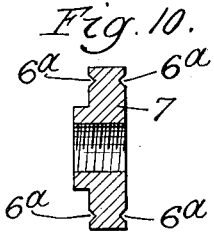
Inventor
James B. Replogle
by Parker & Carter
Attorneys.

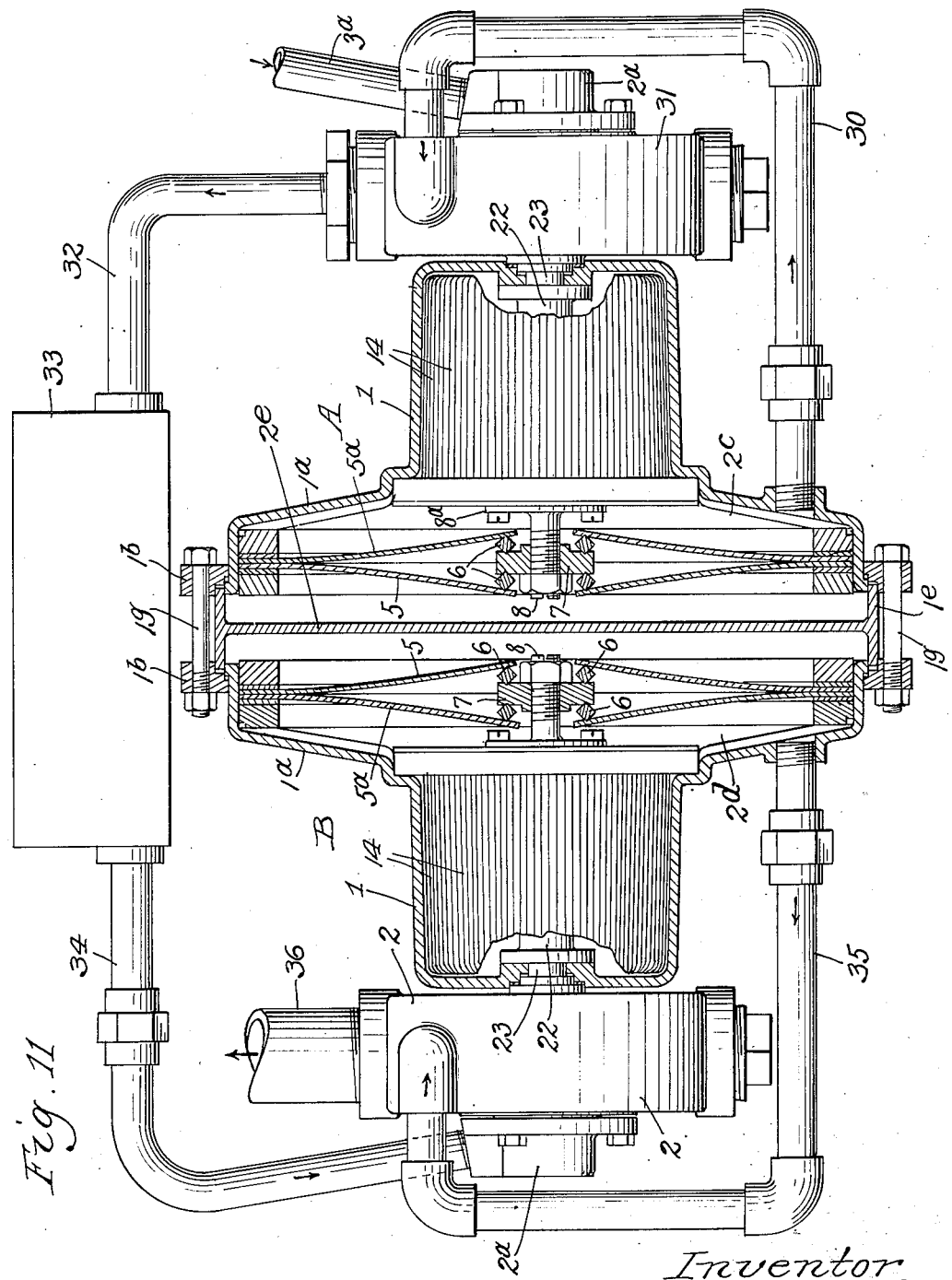

April 23, 1940.  J. B. REPLOGLE  2,198,506
PUMPING APPARATUS
Filed June 14, 1935   6 Sheets-Sheet 5
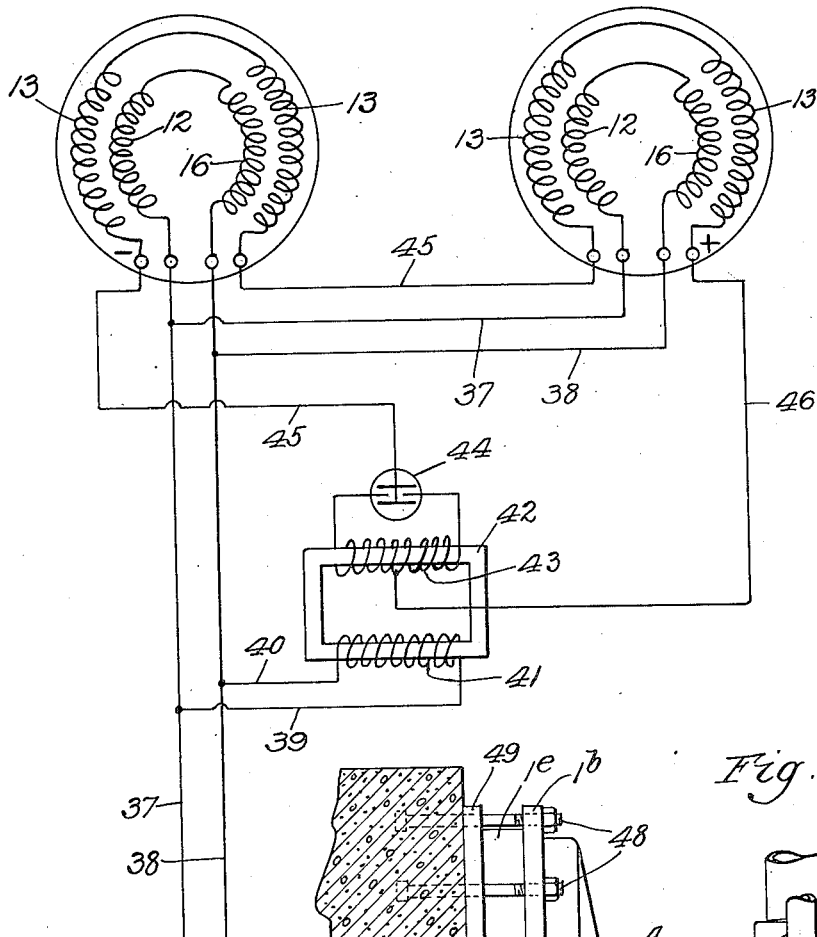
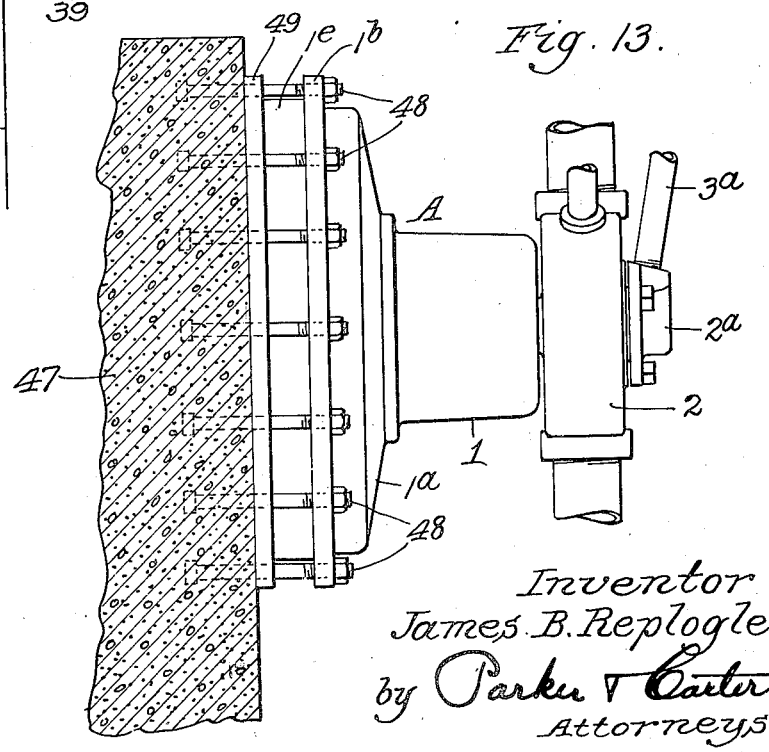
Inventor
James B. Replogle
by Parker & Carter
Attorneys.

April 23, 1940.  J. B. REPLOGLE  2,198,506.
PUMPING APPARATUS
Filed June 14, 1935  6 Sheets-Sheet 6

Inventor
James B. Replogle
by Parker & Carter
Attorneys.

Patented Apr. 23, 1940

2,198,506

UNITED STATES PATENT OFFICE 2,198,506

PUMPING APPARATUS

James B. Replogle, Detroit, Mich.

Application June 14, 1935, Serial No. 26,754

18 Claims. (Cl. 230—55)

This invention relates to an electrically driven pumping apparatus and has for its object to provide a new and improved apparatus of this description.

The invention has as a further object to provide an electrically driven reciprocating apparatus, and more particularly to apply to compressors for compressing gases.

The invention has as a further object to provide an electrically operating reciprocating device free from rotating parts, in which the electrical energy is converted directly into energy of mechanical reciprocation.

The invention has as a further object to provide an electrically operating mechanism consisting of a uni-directional magnetic system and a pair of alternating current wirings producing opposite lineal motion by the action of the same phase of the alternating current in each wiring of the pair.

The invention has as a further object to provide an electrically operating reciprocating device with efficient means for circulating oil, for oiling the moving parts and for dissipating the heat due to the compression of the gases.

The invention has other objects which will be more particularly pointed out in the accompanying description.

Referring now to the drawings,

Fig. 1 is a side elevation of one form of the device embodying the invention;

Fig. 2 is a longitudinal sectional view through one of the pumping elements.

Fig. 3 is a sectional view taken on line 3—3 of Fig. 2;

Fig. 4 is a view taken on line 4—4 of Fig. 2;

Fig. 5 is an enlarged longitudinal sectional view through the reciprocating cylinder, which constitutes the reciprocating element of the device and which is reciprocated by the reversal in direction of the flow of the alternating current;

Fig. 6 is a longitudinal sectional view through the fixed hollow piston upon which the reciprocating cylinder reciprocates;

Fig. 7 is a sectional view through the inductor, which surrounds the reciprocating cylinder;

Fig. 8 is a view of one of the flat springs;

Fig. 9 is a front elevation of the star wheel engaged by the moving ends of the flat springs;

Fig. 10 is a vertical sectional view of the device shown in Fig. 9;

Fig. 11 is a view showing a construction where the device is used to form a two-stage arrangement or compression;

Fig. 12 is a diagrammatic view showing one form of the electric circuits used in the device of Fig. 1;

Fig. 13 is a view showing a modified construction where a single element of the compressor is used;

Like numerals refer to like parts throughout the several figures.

Figure 14:
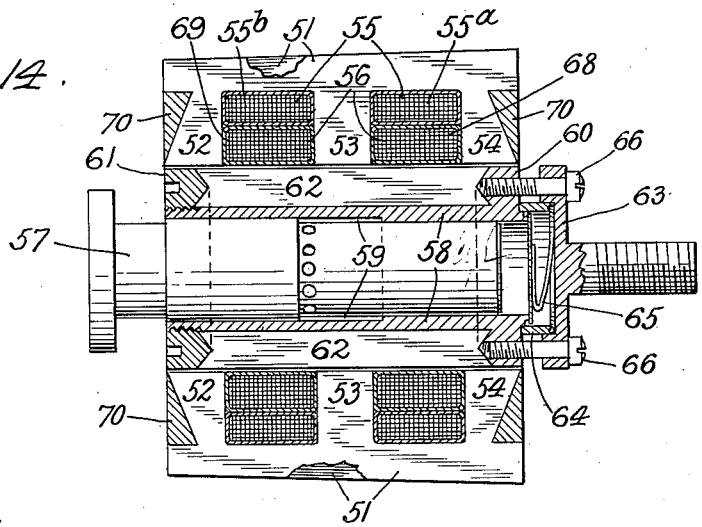
Fig. 14 is a sectional view showing a modified construction.

Referring now to the drawings, the device consists of means for pumping or compressing a gas and this is done by the mechanical reciprocation, with relation to each other, of a cylinder and a piston, the relative reciprocation being caused by the reversal in directions of the flow of alternating current, due to the fact that it is alternating current successively reversing its direction of flow. It is, of course, evident that it is the reciprocation, with relation to each other, of the parts that is utilized to compress the gas and the piston may be reciprocated and the cylinder held stationary, or the cylinder may be reciprocated and the piston held stationary. I have illustrated a construction where the piston is held stationary and the cylinder reciprocated.

In this construction there is provided a magnetic field, which may be produced by a direct current electro magnet, or by means of a permanent magnet or any other suitable means. On opposite sides of this magnetic field there is provided means for producing by alternating current magnetic fields which are opposed to each other and which are alternated with each alternation of the alternating current. These magnetic fields act upon the reciprocating pumping apparatus or compressors. At one phase of the alternating current, for example, the alternating current field on one side of the central field increases the magnetism produced by the central field, and on the other side decreases such magnetism, and this causes the reciprocating cylinder to be moved in one direction. At the next phase of the alternating current the alternating current fields are reversed so that the field which was increasing the magnetism of the central magnetic field works to decrease such magnetism and the other alternating current field works to increase the magnetism of the central magnetic field, thus causing the reciprocating cylinder to be moved in the opposite direction.

Springs are provided which resist the reciprocating movement of the pumping device, and in which energy is stored by the movement, and which energy is utilized to start the reciprocating device in its reverse movement at the end of each stroke. The relative reciprocation of the cylinder and the piston pumps or compresses the gas acted upon and circulates the oil used in connection with the device.

In the particular construction illustrated, there are shown in Fig. 1 two of the pumping elements which pump the gas into a central chamber. These two elements are similar in construction and one of them will be explained in detail and similar reference numerals applied to the other.

Referring now to the particular device shown, and more particularly to the right hand element of Fig. 1, there is provided a frame 1 into which the parts are received. This frame 1 is provided with a section 1a, which has a sealed connection with a similar section 1a on the left hand element, the two sections forming a central chamber 2c, into which the gas is received and which is the high pressure chamber of the device. These parts may be connected together in any desired manner and as herein shown, they are provided with annular flanges 1b, having grooves 1d extending therearound, there being a cylinder member 1e fitting into these grooves with suitable packing 1f, the parts being tightly clamped together by bolts 1g, so as to form a gastight sealed chamber. Within this chamber 2c are two sets of cantilever springs 5 and 5a, which are fastened at their outer edges in any desired manner, as by means of the rings 1c and 3 and the bolts 2b. Any suitable number of these springs may be used and there are shown six pairs of them extending entirely around the chamber 2c. The inner ends of these springs are connected to the reciprocating cylinder in any desired manner. In the particular construction shown, there is located between the two sets of springs a star wheel 7, having grooves 6a on opposite sides thereof. The flat triangular springs on their inner surfaces have similar grooves 6b. Freely mounted in these grooves 6a and 6b are knife-edge bearings 6 of square cross section. These springs are sprung in the direction of the extremity of their motion by an amount constituting more than one-half of the total amplitude of their motion. They then vibrate back and forth from that position, but their movement is such that they never get a reverse stress. In fact they stop before they get back to the zero stress position.

The thickness of the star wheel between the two sets of springs and the knife-edge bearing is sufficient to spread the springs to an amount to constitute more than the total working stroke of the reciprocating members, so as to insure that during the reciprocation of the reciprocative element of the device it is impossible for the springs to become straight, and therefore impossible to begin a deflection in the opposite direction. The star wheel 7 is connected to a reciprocating cylinder which is reciprocated by the electric actuating mechanism.

In the construction shown, the star wheel has a threaded opening through which extends the member 8 having a flange 8a, said flange being attached to the hollow member or inductor 11 by means of the screws 8b. This inductor is preferably of a soft steel structure and within it, and attached to it so as to move with it, is a cylinder 10 of a smooth, metallic nature, preferably hard steel. This inductor and cylinder reciprocate within the electric actuating mechanism.

The springs are cantilever springs and I have, for the purpose of illustration, indicated them as flat triangular springs. It is only necesesary, however, that they be cantilever springs subjected to uniform stress throughout and in which there is no reversal of stress during the action of the compressor.

The frame 1 has a truncated conical chamber 10 and into this chamber are fitted a plurality of tapered laminations 14, which fit smoothly within the truncated chamber on the outside of a cylindrical structure. This cylindrical structure consists of a central portion 13 and two end portions 12 and 16. The end portions 12 and 16 are made up of conductors or ribbons of copper and iron wound into a helix, the copper ribbon being indicated at 12a and the iron ribbon at 16a. The copper and iron ribbons may be insulated from each other, or they may not be insulated from each other, but the convolutions must be insulated from each other. The end portions 12 and 16 are wound or connected oppositely, so that the alternating current flows therethrough in opposite directions. The inductor 11 may be a permanent magnet or may be magnetized by a permanent magnet by a direct current passing through a direct current coil. The inside of this structure forms a cylindrical surface within which the inductor 11 is free to reciprocate without contact, but in close relation thereto. The external surface of the inductor 11 is provided with grooves 11d to provide a vent for any entrapped gas due to the reciprocating motion of the inductor within this cylindrical surface. This inductor 11 is also preferebaly reduced in diameter at the middle as shown at 11c, see Figs. 2 and 7, so that in the normal position we have in effect two circular polar faces 11f and 11g, each held centrally within one of the alternating current helices and shorter than such helices by an amount approximately equal to the maximum operating stroke of the inductor.

Associated with the reciprocating cylinder 10 is an exhaust valve 10b, which is held against its seat by the springs 10a. Within the reciprocating cylinder 10 is a stationary piston which is made up of separable parts. These parts consist of a valve seat 18 against which, that is co-operating with which, is an inlet valve 17a held against the valve seat 18 by a spring 17b. There is a space between the valves 10b and 17a in which the gas is compressed. There is provided an intermediate sleeve 20 and a flanged sleeve 22, all of which are held in proper relation by means of a hollow piston core 23 which passes through a central opening in the frame 1. This piston core also projects through an opening in an oil chamber 2, see Fig. 2. This piston core is threaded at the end and is held in place by a nut 24 which serves the double function of drawing the piston structure rigid in position and at the same time compressing a packing 24a. Between the valve seat 18 and the intermediate sleeve 20 and between intermediate sleeve 20 and flanged sleeve 22 are clamped cup shaped packing rings 19 of suitable material to form a tight joint. These packing rings engage the inside surface of the reciprocating cylinder 10. It is, of course, understood that any desired packing or packing ring arrangement might be used. The piston has two sections of different diameters which correspond to two separate diameters on the internal surface of the reciprocating cylinder 10.

The central polarizing element 13 acts to produce a magnetic field and the helices 12 and 16, through which the alternating current flows, are oppositely connected with relation to each other so that if at any instance the magnetic effect of one of them is to increase the magnetism produced by the polarizing element 13, the magnetic effect in the other will be to decrease that magnetic effect. This therefore produces an axial motion of the inductor 11, which will thereby include a greater portion in the assisting field causing the motion and will exclude a greater portion of the retarding magnetic field opposing the motion. The inductor and reciprocating cylinder and associated parts are thus moved in one direction, say to the left in Fig. 2. On the reversal of the alternating current, the helix which assisted the polarizing element in magnetic effect now tends to decrease the magnetic effect of the polarizing element, while the helix on the other side thereof now tends to assist the polarizing element. The inductor, therefore, moves in the opposite direction so as to again include more of the assisting magnetic field and exclude more of the opposing or retarding magnetic field. It is therefore apparent that the alternation of the current in this structure produces a mechanical reciprocation of the inductor and the reciprocating cylinder and associated parts. This mechanical reciprocation produces a considerable amount of kinetic energy, or energy of motion, which must be somehow absorbed before the reciprocating parts can be made to move in the opposite direction. This is accomplished by the springs 5 and 5a. Any association of mass and controlling resiliency has a certain frequency of vibration and can be termed the tuned frequency of the device. In the structure which is described the relation between the reciprocating mass and the resiliency of the controlling springs is fixed, so that if a 60 cycle alternating current is used, the natural period of vibration of the structure is so related to 60 cycles a second as to give the best electrical relation between the reciprocating parts and the phase of the alternating current which is causing them to move.

The particular form of spring element shown is of an effective triangular shape and this has many advantages. This shape provides a uniform stress within the active part of the spring material for a definite deflection. In each active portion of the spring there is a minimum quantity of spring material for a given desired maximum stress. The adjusting of the tuning relation between the resiliency of the spring and the mass of the moving parts can best be accomplished by having the masses, which will tend to move oppositely to each other, of the same quantity so as to produce a balanced pair relation, and effect a tuning adjustment by operating upon the springs so as to control their resiliency. The triangular flat springs lend themselves particularly well to this operation because the removal of relatively large amounts of the spring in the form of small triangular sections from the edge of the spring results in relatively small change in the resiliency of the spring, and therefore provides an extremely sensitive method of having each spring adjusted to be the desired equivalent of every other one, and thereby provides a uniform as well as accurate adjustment.

When two power units A and B are used, as illustrated in Fig. 1, they are identical in construction and each has a set of the springs 5 and 5a and each draws air, gas or whatever fluid is acted upon, into the central chamber 2c. When these two power units are used, the arrangement is such that the several currents in each element of the device, that is in each half of the device, are identically carried through the elements as seen from the individual small ends of each, that is the oil receptacle ends, so that the reciprocating motion in both is the same with reference to whether it is to or from the spring mountings. When the halves are mounted together with spring mountings adjacent, this results in the absolute motion of the parts being equal and opposite at all times. This arrangement places the device in balance and eliminates vibration of the machine as a whole. The phase relation of the alternating current flowing through the machine and the alternating voltage causing the current to flow can be controlled by the natural tuned period of the reciprocating structure and its springs to the frequency of the current supplied to the machine.

In the particular construction shown the resiliency of the springs 5 and 5a is preferably so proportioned to the mass of the reciprocating element that the natural period of vibration of the element is properly related to the frequency of the alternating current. Assuming, for example, that a 60 cycle alternating current is used, it is necessary then that the reciprocating period of the inductor and reciprocating cylinder and the parts connected therewith be properly related to 60 cycles per second. With this condition of tuning between the mechanical vibration or reciprocating period of the reciprocating element, and the electrical frequency of the current, the amplitude of vibration will be built up to an appreciable value determined by the electrical characteristics of the apparatus and the devices become a reciprocating electric motor, vibrating with true harmonic motion. It results in the compression of the gas in the following manner:

Referring now particularly to the right half of the structure, shown in Fig. 1, and supposing that the direction of the alternating current is such that the reciprocating structure is moved to the left, this causes the exhaust valve 10b to move away from the inlet valve 17a. This increases the volume of the space enclosed between these two valves and therefore decreases the pressure of the gas in this space between them. When this decrease of pressure has reached an amount sufficient to overcome the entire pressure of the spring 17b, which is holding the inlet valve 17a against the valve seat 18, the inlet valve 17a will move away from the valve seat 18, at least for a portion of the periphery thereof, and will permit the inlet of gas from the internal chamber of the piston core 23 through the opening between valve 17a and the seat 18 into the space between the two valves, and this continues until the reciprocating structure has reached the limit of its left hand movement. At this point the effect of the springs 5 and 5a is such that they will have absorbed the kinetic energy of the moving parts and changed it into potential energy in the springs 5 and 5a in the form of axial strain. This pressure will cause the reciprocating parts to start moving in the opposite direction, that is toward the right, and the volume of the space between the valves will be decreased and the pressure of the enclosed gas will be increased. When the pressure of the enclosed gas has increased to an amount greater than the pressure on the left side of the exhaust valve 10b, produced by the spring 10a, by an amount equal to the pressure with which the spring 10a is holding the valve 10b against its seat, the valve 10b will be moved from its seat, at least at one portion, and provide a discharge opening for the gas between the valves, such gas passing through this discharge opening, and passing through openings 1b into the high pressure chamber 2c, until the valves have come over into contact or close relation and the material which has been delivered into the space between the two valves and compressed between them has been transferred into the high pressure chamber 2c. The gas which enters the chamber between the two valves comes in through the hollow of the piston core 23 from the source of gas in the chamber 2a, which is mounted on the end of the piston core 23 and with which the hollow of the piston core communicates, see Figs. 2 and 6. The gas coming from the source of supply enters the chamber 2a through the inlet 3a.

The compression of gas is accompanied by the transference of energy into what is called the heat of compression and some efficient and safe way of removing this heat of compression should be provided. Also there should be some way of properly lubricating the movement of the cylinder on the piston. Furthermore, a leakage of gas, being compressed, by a series of rings or similar surfaces is very much retarded if the spaces be filled with some lubricant. There is provided a system of oil circulation in the present device. It will be seen that the outside surface of the piston and the inside surface of the reciprocating cylinder are provided with two different diameters. This produces an annular chamber 20a between the cylinder and the piston. The volume of this annular chamber increases as the cylinder moves to the left and decreases as the cylinder moves to the right. This varying volume is therefore used as an oil circulating means. In the construction shown the oil is contained in an oil reservoir 2, which is connected to the high pressure chamber 2c, so as to have the same pressure as the gas within the chamber 2c, the compressed gas flowing into this oil reservoir 2. As the cylinder 10 moves to the left, the increasing volume in the annual chamber 20a is occupied by oil which travels through the foot valve 26, see Figs. 2 and 6, and upward into a channel 20b on the bottom of the piston core 23, and along that channel until it reaches a circular groove 20c, which connects with a series of radial holes 20d in the portion 20 of the piston. The oil then passes radially out through these holes and fills the annular chamber as it increases in size. After the cylinder 10 has reached the left hand limit of its stroke and starts back, the volume of the annular chamber 20a becomes decreased and the oil which has flowed in from the oil chamber 2 is now driven out through the same radial holes 20d into the circular groove 20c, and through a channel 20e on the upper side of the piston core 23, and out through the check valve 25 back into the chamber 2. This provides a very successful means of carrying the heat of compression away from the cylinder by means of this oil and delivering it into the large oil chamber 2, from where it is easily dissipated.

In Fig. 11 there is shown a modified construction, where the two compression elements A and B are used to provide a two-stage compression. In this construction the parts may be the same as previously described and the gas compressed, for example, by one element is then delivered to the other element and further compressed to secure a higher pressure. It is, of course, evident that any number of these elements may be coupled together to produce any desired number of stages of compression. I have shown in Fig. 11, for example, the element A, compressing the gas in the chamber 2c, separated from chamber 2d by partition 2e. It is then conducted by the pipe 30 to the oil chamber 31 and thence by pipe 32 to intercooler 33, and thence by pipe 34 to the element B, where it is again compressed and discharged from the high pressure chamber 2d of element B into pipe 35, and thence into oil chamber 2, and thence through outlet 36 to the point of use.

In Fig. 12 there is illustrated diagrammatically the circuit for the device shown, for example, in Fig. 1. In this figure the conductors 37 and 38 are connected with the source of supply, which is a suitable alternating current source, and are connected with the coils 12 and 16 to both elements of the device, thus delivering alternating current to these two coils. When the polarizing or central element 13 is an electro-magnet, a portion of the current then passes by means of conductors 39 and 40 to the primary coil 41 of the transformer 42, where it is changed into potential by the secondary coil 43, and passes through a rectifier 44. This current then passes by conductor 45 to the two sections of the coil 13 of both elements A and B, and thence by conductor 46 back to the secondary coil 43.

In Fig. 13 I have shown a modified construction where a single element of the compressor is used, namely the element A. The construction of this device is the same as element A in Fig. 1 and it is attached to some suitable member or foundation 47, which takes care of vibration. This attachment may be made by means of the bolts 48, which hold the cover plate 49 in place. This foundation may be, for example, made of concrete and the bolts 48 may be embedded therein.

The construction shown in Fig. 14 differs from the one preceding it in that instead of edgewise wound conductors carrying heavy currents at low voltage and separated by single edge-wise wound steel pieces, there is substituted a structure of a laminated magnetic circuit enclosing a line voltage construction windings. The arrangement will be better understood from the following description:

Seated into the truncated conical chamber of the casing 1, as shown, are a series of laminations 51, tapered to size, tapered one way so as to fit into the truncated chamber of the casing and tapered in the other direction so as to form a section with the side of the section extending radially to the center of the entire section. This is similar to the shape of commutator bars. These laminations 51 have three projecting pole faces 52, 53 and 54. Between these pole faces are annular spaces in which are placed two similar field windings 55 and armature wirings 56. The inside of the armature 56 and the pole faces 52, 53 and 54 form a hollow cylinder of uniform diameter. Centrally located within the structure is the fixed piston structure 57 which is similar to that described in the preceding device of Fig. 1. Supported by this fixed piston structure 57 is a cylinder 58, which is free to reciprocate longitudinally, as in the preceding device. Both the piston 57 and the cylinder 58 have two diameters, as described in the previous device, leaving between them an annular chamber 59, which is employed for circulating the lubricant and as a cooling medium, as previously described. This cylinder member 58 in this particular structure is made of non-magnetic metal, preferably cast bronze, and has on one end an integral head 60. The other end is threaded to receive a nut member 61. Supported by the head member 60 and the nut member 61 are a series of laminations 62 which are rigidly held in place by the tightening of the nut 61 on the cylinder 58 and the outside surfaces of the laminations 62 are given a final finishing operation. The structure formed by the cylinder 58 and the laminations 62 therefore forms a reciprocating unit which is free to move outside of the piston structure 57 and inside of the structure 52, 53, 54 and concentric with both. This combination of cylinder 58 and laminations 62 may be termed the inductor. As in the previous device this inductor 62 carries and is rigidly attached to a driving flange 63, the attachment being by means of a valve clamping ring 63 which fits about a projection in the cylinder structure 58 and by means of which valve spring 65 is clamped between the grooved end of the valve clamping ring 64 of the drive flange 63, the whole being held in permanent relation by means of the screws 66. This drive flange 63 is the means by which the inductor is attached to the main tuning springs and held in proper position axially with the cylinder structure formed by pole faces 52, 53, 54. These pole faces 52, 53, 54 have an axial length approximately equal to the mass stroke of the inductor and the laminations 62 of which the inductor is made have an over-all length which is less than that of the over-all length of the lamination 51, but an amount approximate with the mass working stroke of the cylinder 59 on the piston 57. In the normal operating position the inductor 62 is so located between the springs as to be in proper position with relation to the pole faces 52, 53, 54.

The difference in the construction of Fig. 14 and Fig. 1 is confined to the electrical construction. The rest of the device is similar to that of Fig. 1 and I have omitted these parts from Fig. 14 to bring out more clearly this electrical structure.

Let us suppose that at any instant the direct current is traversing coils 56 in such a direction that the effect of the polarizing coils is to cause a flow of magnetism centrally through pole piece 53 and across the air gap between pole piece 53 and lamination 62 and through lamination 62 toward their ends, across the air gap again into pole piece 52 and 53, outwardly through these pole faces and through laminations 51 in the pole face 53. Let us suppose that the amount of the magnetic effect produced by this current is such as to produce a little less than one-half the amount of magnetism that can flow through these parts without producing magnetic saturation. This direct current coil 55 is invariable in direction and amount. At any instant let us suppose that the current through the armature coil is in such a direction as to assist the magnetic effect of the field current in the coil 55a, while at the same instant the magnetic effect of the alternating current in the armature coil 69 is opposed to the magnetic effect of the field current in the coil 55b. Assuming that the maximum amount of magnetic effect of the alternating current through these coils shall be equal to the magnetic effect of the last field coil with which they are most closely associated, then at the instant assumed, it is apparent that the magnetic effect of the current in the coil 69 will be to double the amount of magnetism flowing from 53 to 54 and that it will neutralize or destroy the magnetism flowing from 53 to 52. It is evident that axial motion of the inductor 62 away from the pole faces 52 will not effect the total magnetism threading the armature coil 69, the armature coil 69, causing the magnetism threading this coil, having been utilized by the magnetic action of the current in that coil. However a movement toward pole face 54 will very greatly increase the total magnetic flux threading the armature coil 68 which has been doubled by the magnetic effect of the current flowing through that coil because, as the inductor 62 moves axially in the direction of 54, the amount of magnetism is decreased and there therefore will be a tendency for the inductor to move in that direction. With a 60 cycle current, at a time 1/120 of a cycle later than that just described, the field current in coils 55b remains as before. The current in coils 69 and 55a will have reversed their direction and therefore the opposite condition to that previously described exists. The magnetism from pole 53 to pole 54 will not be diminished and magnetism from 53 to 52 be doubled. There, therefore, will now be a tendency for the inductor to move axially away from 52. It is therefore apparent that the reversal of polarization in the alternating current circuit will be accompanied by the reversal of motion in the mechanical structure and constitutes the reciprocation of the parts that is desired, the compression of the gas and the oil and cooling for the construction of Fig. 14 is similar to that of Fig. 1 and has been omitted for clearness.

It will be noted that at the ends of laminations 51 there are provided recesses into which are fitted the rings 70 which are preferably of copper. These rings have two functions. One, and most important, that they serve to limit the inward movement of the laminations 51 when being placed into the truncated conical chamber of the casing, and therefore insure a smooth cylindrical surface on the insides of the pole faces 52, 53, 54. They also serve as a short circuiting portion to limit the magnetism from the ends of laminations 62 around the top and to the sides of poles 52 and 54.

The advantages of this structure over the preceding one of Fig. 1 are largely a saving in the amount of material that is required for the transformer which is used with the electrical structure. With the prior structure, it is necessary that the main operating wattage pass through three wirings, the primary of the transformer, the secondary of the transformer and the armature wiring of the machine itself. It is, therefore, necessary to provide copper for this triple condition of the main operating wattage. In this structure of Fig. 14 the main operating wattage is passed through but one set of wirings, namely the coils 69 and 68 and the copper of two sets of wirings is thereby saved. There will also result an easier control of the power factor because there will be less tendency for variation in the circuit, than in the previous "sandwich" edgewise wound structure, and it will not be necessary to have such a fine degree of tuning of the cantilever springs. The transformer that will be necessary will be that only required for a relatively small amount of wattage that passes through direct current wiring 52a and 55b, which must also be supplied in addition to the armature current in the previous structure. The combination of laminations and wirings will be considerable less expensive to construct, insulate and install than the previous edge-wise wound "sandwich" structure.

Figure 15:
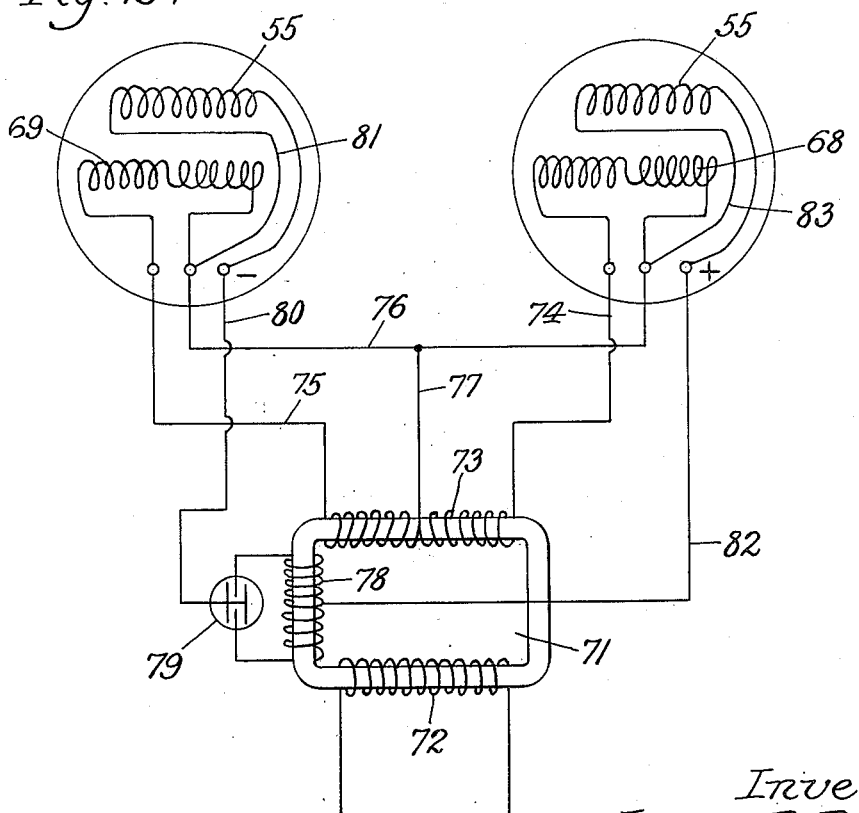
Fig. 15 is a diagrammatic view showing the electric circuits where two elements like that shown in Fig. 13 are used.

In Fig. 15 there is illustrated diagrammatically the circuits for the device shown in Fig. 14, when both elements of the device are in position as shown in Fig. 1. In this construction the transformer 71 has the primary circuit 72 and the secondary circuit 73. The secondary circuit is connected by conductors 74 and 75 with the armature circuits 68 and 69, which circuits are connected together by the conductor 76, said conductor being connected to the center of the secondary coil by the conductor 77. The transformer is provided with the tertiary circuit 78 which is connected to the rectifier 79 and this rectifier is connected by the conductor 80 with the field coil 55, the other end of the field coil being connected by conductor 81 with the conductor 76. Extending from the middle of the tertiary circuit 78 is conductor 82, which extends to the other field coil 55, the other end of said field coil being connected by conductor 83 with the conductor 76.

I have shown in Fig. 1 in a diagrammatic manner the different connecting pipes for the material to be compressed. This material, for example, enters through the pipe 3b and then passes by pipe 3a into chamber 2a and hollow piston 23 in between the valve 10a and 17a, and is compressed and delivered into high pressure chamber 2c, see Fig. 2. This high pressure gas then passes into pipes 3c and 3d to oil chambers 2, and then passes out through the pipes 3e to the pipe 3f to the point of use. There is also shown a pipe 3g connecting the two oil chambers 2 together to insure the equalizing pressure in the chambers. By having the pressure in the oil chambers the same as the pressure in the high pressure chamber 2c the oiling of the parts is carried out most effectively and is not interfered with by differences in pressure of the gas. I have shown the pipe 3g as bent downwardly simply so that it may be properly seen, but in practice it would extend straight across between the two oil chambers 2. These pipes, as before stated, are arranged diagrammatically so that they may be properly seen and so as to avoid confusion which would occur if they were placed in the exact positions in which they are used in practice.

The electric circuits are connected to the coils as illustrated in the diagrammatic circuits and these connections are made through properly packed openings in the casing so as to avoid leakage.

I have described in detail a particular construction embodying the invention, but it is of course evident that the parts may be varied in many particulars and some of the parts omitted, and some parts used not here shown, without departing from the spirit of the invention as set forth in the claims hereto appended, and I therefore do not limit myself to the particular construction shown.

I claim:

1. An electrically operated pumping apparatus comprising a fixed part, a pair of coaxial reciprocating compressor members, separate electric means for electrically reciprocating the separate compressor members in opposite directions, and cantilever springs associated with each compressor member, said springs having their outer ends fixedly connected to said fixed part and the other ends adjustably connected to the reciprocating compressor members of the compressor with which they are associated, for elastically resisting the reciprocating movement of said parts.

2. An electrically operated pumping apparatus comprising a fixed part, a reciprocating compressor member, electric means for reciprocating said compressor member, and cantilever springs associated with said compressor member, said springs having their outer ends connected to a fixed part, the inner ends converging toward a common center and being connected to the reciprocating part of the compressor member for elastically resisting the reciprocating movement of said part.

3. An electrically operated pumping apparatus comprising a fixed part, a reciprocating compressor member, electric means for reciprocating said compressor member, and cantilever springs associated with said compressor member, said springs connected to a fixed part at one end, the other end being connected to the reciprocating part of the compressor member for elastically resisting the reciprocating movement of said part, a chamber into which the compressed material is discharged from the compressor member, said springs being located in said chamber.

4. An electrically operated pumping apparatus comprising a reciprocating compressor, electric means for reciprocating said compressor, said compressor comprising a reciprocating hollow cylinder, a fixed piston within the hollow cylinder and along which the hollow cylinder reciprocates, a moving valve for closing the hollow end of said fixed piston, a valve connected with said reciprocating cylinder, the reciprocation of the cylinder in the other direction causing the gas to pass out of said space, and a pressure chamber into which said gas is received, an oil chamber associated with said device, and means brought into action by the reciprocation of said cylinder for drawing oil into position to lubricate the reciprocating parts.

5. An electrically operated pumping apparatus comprising a reciprocating compressor, electric means for reciprocating said compressor, said compressor comprising a reciprocating hollow cylinder, a fixed piston within the hollow cylinder, and along which the hollow cylinder reciprocates, a moving valve for closing the hollow end of said fixed piston, a valve connected with said reciprocating cylinder, the reciprocation of the cylinder in one direction causing the gas to pass from the fixed piston into the space between said valves, and reciprocation of the cylinder in the other direction causing the gas to pass out of said space, a pressure chamber into which said gas is received, an annular oil chamber between said cylinder and said piston, an oil reservoir associated with said device, and means brought into operation by the reciprocation of said cylinder for drawing oil into said annular chamber to absorb heat produced by the compression of the gas, and for discharging said oil back into said oil reservoir.

6. An electrically operated pumping apparatus comprising a reciprocating compressor, electric means for reciprocating said compressor, said compressor comprising a reciprocating hollow cylinder, and a fixed piston within the hollow cylinder and along which the hollow cylinder reciprocates, an annular chamber between said reciprocating cylinder and said piston, and means brought into operation by the reciprocation of the cylinder for inserting oil into said annular chamber, and discharging it therefrom to absorb and remove heat produced by the compression of the gas.

7. An electrically operated actuating mechanism for a reciprocating pumping device, comprising a central polarizing device, alternating current coils on each side of said polarizing device and connected so that the current flows in opposite directions thereto, a reciprocating pumping device located within said coil and polarizing device and arranged so that one alternating current coil assists the polarizing device to move the pumping device in one direction, and when the alternating current changes, the other alternating current coil assists the polarizing device to move the pumping device in the opposite direction to produce the reciprocating pumping action, and a series of flat triangular springs connected with said reciprocating pumping device for elastically resisting the movement thereof in both directions, said flat triangular springs arranged concentrically and having their outer ends fastened to a fixed part and their inner ends connected with the reciprocating device, and means for preventing reversal of stresses in said springs when the device is operated.

8. An electrically operated pumping apparatus comprising a truncated conical chamber, a plurality of tapered laminations which fit smoothly within the truncated conical chamber, a cylindrical construction which fits tightly into the interior of the plurality of tapered laminations, said cylindrical structure forming an electric operating mechanism, a reciprocating pumping apparatus therein reciprocably operating to produce the pumping action.

9. A device of the kind described comprising a truncated conical chamber, a plurality of tapered laminations which fit smoothly within the truncated conical chamber, a cylindrical construction which fits tightly into the interior of the plurality of said tapered laminations, said cylindrical structure forming an electric operating mechanism, a reciprocating pumping apparatus therein reciprocally operating, an electric operating central polarizing element, and alternating current coils on each side thereof, wound so as to oppose each other and to successively oppose and resist the magnetic effect produced by said central polarizing element.

10. A device of the kind described comprising a truncated conical chamber, a plurality of tapered laminations which fit smoothly within the truncated conical chamber, a cylindrical construction which fits tightly into the interior of the plurality of said tapered laminations, said cylindrical structure forming an electric operating mechanism, a reciprocating pumping apparatus therein reciprocably operating, an electric operating central polarizing element, alternating current coils on each side thereof, wound so as to oppose each other and to successively oppose and resist the magnetic effect produced by said central polarizing element, a reciprocating inductor within said coils and polarizing element, a hollow cylinder connected with said inductor, and a fixed piston with which said hollow cylinder cooperates, the reciprocation of the cylinder with relation to the piston compressing the material acted upon to produce the pumping action.

11. A device of the kind described comprising a truncated conical chamber, a plurality of tapered laminations which fit smoothly within the truncated conical chamber, a cylindrical construction which fits tightly into the interior of the plurality of said tapered laminations, said cylindrical structure forming an electric operating mechanism, a reciprocating pumping device therein reciprocally operating, an electric operating central polarizing element, alternating current coils on each side thereof, wound so as to oppose each other and to successively oppose and resist the magnetic effect produced by said central polarizing element, a reciprocating inductor within said coils and polarizing element, a hollow cylinder connected with said inductor, and a fixed piston with which said hollow cylinder cooperates, the reciprocation of the cylinder with relation to the piston compressing the material acted upon to produce the pumping action, and a pressure chamber into which said material is discharged.

12. A device of the kind described comprising a truncated conical chamber, a plurality of tapered laminations which fit smoothly within the truncated conical chamber, a cylindrical construction which fits tightly into the interior of the plurality of said tapered laminations, said cylindrical structure forming an electric operating mechanism, a reciprocating pumping device therein reciprocally operating, an electric operating central polarizing element, alternating current coils on each side thereof, wound so as to oppose each other, and to successively oppose and resist the magnetic effect produced by said central polarizing element, a reciprocating inductor within said coils and polarizing element, a hollow cylinder connected with said inductor, a fixed piston with which said hollow cylinder cooperates, the reciprocation of the cylinder with relation to the piston compressing the material acted upon to produce the pumping action, a pressure chamber into which said material is discharged, a series of flat triangular springs in said compression chamber, having their outer ends fastened to a fixed part, the inner ends being in proximity to each other, and connected with the reciprocating inductor and cylinder.

13. An electrically operating pumping mechanism comprising a uni-directional polarized electro-magnetic system and a pair of alternating current wirings producing opposite lineal motion by the action of the same phase of the alternating current in each wiring of the pair and a reciprocating pumping apparatus actuated thereby.

14. An electrically operated pumping apparatus comprising a reciprocating compressor having a hollow cylinder, a piston therein, and means for relatively reciprocating said piston and cylinder, a pressure chamber in proximity to one end of said piston and cylinder, communicating with the cylinder and extending in a direction at right angles to the axis of said cylinder beyond the periphery of the cylinder.

15. An electrically operated pumping apparatus comprising a cylinder, a piston therein, electric means for relatively reciprocating said cylinder and piston, and cantilever springs connected at one end to a fixed part of the device, the other ends of said springs converging toward the center and separated by a space and being positioned to act to elastically resist the relatively reciprocating movement of said piston and cylinder, said cantilever springs having their longest dimensions at an angle to the axis of said cylinder.

16. An electrically operated actuating mechanism comprising a central polarizing device, alternating current coils on each side of said polarizing device and connected so that the current flows in opposite directions thereto, a reciprocating pumping device located within said coil and polarizing device and arranged so that both alternating current coils assist the polarizing device to move the pumping device in one direction, and when the alternating current changes, both alternating current coils assist the polarizing device to move the pumping device in the opposite direction to secure the pumping action.

17. An electrically operated actuating mechanism comprising a central polarizing device, alternating current coils on each side of said polarizing device and connected so that the current flows in opposite directions thereto, a reciprocating pumping device located within said coil and polarizing device and arranged so that one alternating current coil assists the polarizing device to move the pumping device in one direction, and when the alternating current changes, the other alternating current coil assists the polarizing device to move the pumping device in the opposite direction to secure the pumping action, and a series of flat triangular springs connected with said reciprocating pumping device for elastically resisting the movement thereof in both directions.

18. An electrically operated actuating mechanism comprising a central polarizing device, alternating current coils on each side of said polarizing device and connected so that the current flows in opposite directions thereto, a reciprocating pumping device located within said coil and polarizing device and arranged so that one alternating current coil assists the polarizing device to move the pumping device in one direction, and when the alternating current changes, the other alternating current coil assists the polarizing device to move the pumping device in the opposite direction to secure the pumping action, and a series of flat triangular springs connected with said reciprocating pumping device for elastically resisting the movement thereof in both directions, said flat triangular springs arranged concentrically and having their outer ends fastened to a fixed part, and their inner ends connected with the reciprocating pumping device.

JAMES B. REPLOGLE.